United States Patent
Hartnack et al.

(10) Patent No.: US 7,314,676 B2
(45) Date of Patent: Jan. 1, 2008

(54) FUEL-CELL STACK

(75) Inventors: Herbert Hartnack, Erlangen (DE); Josef Lersch, Heroldsbach (DE); Arno Mattejat, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 629 days.

(21) Appl. No.: 10/490,846

(22) PCT Filed: Sep. 13, 2002

(86) PCT No.: PCT/EP02/10315

§ 371 (c)(1),
(2), (4) Date: Mar. 26, 2004

(87) PCT Pub. No.: WO03/030287

PCT Pub. Date: Apr. 10, 2003

(65) Prior Publication Data

US 2004/0258969 A1 Dec. 23, 2004

(30) Foreign Application Priority Data

Sep. 27, 2001 (EP) .................................. 01123171

(51) Int. Cl.
*H01M 8/04* (2006.01)
(52) U.S. Cl. .......................................... 429/26; 429/34
(58) Field of Classification Search .................. 429/26, 429/34

See application file for complete search history.

(56) References Cited

U.S. PATENT DOCUMENTS

| | | | |
|---|---|---|---|
| 4,973,530 A * | 11/1990 | Vanderborgh et al. | ......... 429/13 |
| 5,200,278 A | 4/1993 | Watkins et al. | |
| 5,382,478 A | 1/1995 | Chow et al. | |
| 5,858,569 A | 1/1999 | Meacher et al. | |
| 6,602,625 B1 * | 8/2003 | Chen et al. | ................... 429/13 |

FOREIGN PATENT DOCUMENTS

| | | |
|---|---|---|
| EP | 0 591 800 A1 | 4/1994 |
| EP | 1 182 720 A1 | 2/2002 |
| JP | 06-124722 | 5/1994 |
| JP | 07-326376 | 12/1995 |
| JP | 08-138704 | 5/1996 |
| JP | 9-92308 | 4/1997 |
| JP | 9-204924 | 5/1997 |
| JP | 10-172592 | 6/1998 |
| WO | WO 00/10209 | 2/2000 |
| WO | WO 00/41261 | 7/2000 |
| WO | WO 01/48849 A1 | 7/2001 |

* cited by examiner

*Primary Examiner*—Tracy Dove
(74) *Attorney, Agent, or Firm*—Harness, Dickey & Pierce, P.L.C.

(57) ABSTRACT

During the humidification of operating gases for a fuel cell, the operating gases cool to such an extent as a result of the loss of evaporation heat that they cannot absorb humidity to prevent damage to the membrane of the fuel cell. To solve this problem, a fuel cell assembly includes a humidification cell, which contains a planar heating element. The humidification cell is configured in terms of shape, location and materials in the same way as a fuel cell of the fuel-cell stack.

16 Claims, 2 Drawing Sheets

FUEL-CELL STACK

This application is the national phase under 35 U.S.C. § 371 of PCT International Application No. PCT/EP02/10315 which has an International filing date of Sep. 13, 2002, which designated the United States of America and which claims priority on European Patent Application number EP 01123171.9 filed Sep. 27, 2001, the entire contents of which is hereby incorporated herein by reference.

FIELD OF THE INVENTION

The invention generally relates to a fuel cell stack or block. Preferably, it relates to one having a stack of planar fuel cells and a stack of planar humidification cells. More preferably, the humidification cells each include a gas space, a humidification water space and a water-permeable membrane arranged between the two spaces.

BACKGROUND OF THE INVENTION

In a fuel cell, electric current is generated with a high efficiency by the electrochemical combination of hydrogen ($H_2$) and oxygen ($O_2$) at an electrolyte to form water ($H_2O$), and if the fuel gas used is pure hydrogen, there are not even any emissions of pollutants and carbon dioxide ($CO_2$). Technical implementation of this principle of the fuel cell has lead to various solutions, specifically with different electrolytes and operating temperatures between 60° C. and 1000° C. The fuel cells are classified as low-temperature, medium-temperature and high-temperature fuel cells as a function of their operating temperature, and these classes can in turn be subdivided by virtue of having different technical embodiments.

An individual fuel cell provides an operating voltage of at most approximately 1.1 V. Therefore, a large number of fuel cells are stacked on top of one another to form a fuel cell stack which forms part of the fuel cell block. Connecting the fuel cells of the fuel cell block in series makes it possible to achieve operating voltages of a fuel cell block of 100 V and above.

A planar fuel cell includes a flat electrolyte, one flat side of which is adjoined by a flat anode and the other flat side of which is adjoined by a likewise flat cathode. These two electrodes together with the Electrolyte form what is known as an electrolyte-electrode assembly. An anode gas space is arranged adjacent to the anode, and a cathode gas space is arranged adjacent to the cathode.

Between the anode gas space of a fuel cell and the cathode gas space of a fuel cell which adjoins this fuel cell there is an interconnector plate. The interconnector plate produces an electrical connection between the anode of the first fuel cell and the cathode of the second fuel cell. Depending on the type of fuel cell, the interconnector plate is designed, for example, as an individual metallic plate or as a cooling element which includes two stacked plates with a cooling water space between them. Depending on the particular embodiment of the fuel cells, further components, such as for example electrically conductive layers, seals or pressure cushions, may be present in a fuel cell stack.

While they are operating, the fuel cells of a fuel cell block are supplied with operating gases, i.e. a hydrogen-containing fuel gas and an oxygen-containing oxidation gas. Some embodiments of low-temperature fuel cells, in particular fuel cells with a polymer electrolyte membrane (PEM fuel cells), require humidified operating gases for them to operate. These operating gases are saturated with steam in a suitable device, such as for example a liquid ring compressor or a membrane humidifier.

If the operating gases are passed through long operating gas feedlines from the humidifier to the fuel cell block, the temperature of a humidified operating gas may drop over this path as a result of heat being lost to the environment. This leads to condensation of humidification water. The operating gases are then heated again in the fuel cells, with the result that their relative humidity decreases. As a result, the electrolyte, which is always to be kept moist and is extremely sensitive to drying out, is damaged, with the result that its service life is shortened. It is therefore desirable for the humidifier to be arranged as close as possible to the fuel cells.

U.S. Pat. No. 5,200,278 and U.S. Pat. No. 5,382,478 have disclosed a fuel cell block having a stack of planar fuel cells and a stack of planar humidification cells. The two stacks are arranged directly adjacent to one another in the fuel cell block. The humidification cells are designed as membrane humidifiers with an operating gas space, a humidification water space and a water-permeable membrane arranged between the two spaces. Before the operating gases are fed to the fuel cells of the fuel cell stack, they flow through the humidification cells, where they are humidified, and then flow into the fuel cell stack without having to leave the fuel cell block.

In the humidification cells, the operating gases are humidified with the aid of the cooling water from the fuel cells. The cooling water, which has been heated to the temperature of the fuel cells, flows through the humidification water space, penetrates through the water-permeable membrane and then humidifies the operating gas to a degree of humidification of approximately 100%. However, the evaporation of the humidification water from the membrane into the gas space consumes heat from the operating gas as heat of evaporation. This reduces the temperature of the operating gas flowing through the gas space considerably. The operating gas, which has been humidified to approximately 100% in the humidification cells, is therefore heated again in the fuel cells, with the result that the degree of humidification of the operating gas drops and the electrolyte is attacked.

SUMMARY OF THE INVENTION

An object of an embodiment of the present invention is to provide a fuel cell block which allows virtually 100% humidification of the operating gases with respect to the temperature level of the fuel cells.

An object may be achieved by a fuel cell block, in which, according to an embodiment of the invention, each of the humidification cells includes a planar heating element adjacent to the gas space.

The heating element is configured in such a way that the operating gas can flow along the heating element during the humidification operation. The operating gas, despite releasing heat of evaporation, is brought to or held at approximately the temperature of the fuel cells of the fuel cell block. As a result, the operating gas is not significantly heated when it enters the fuel cells, and the 100% degree of humidification is retained.

The heating element is brought to the temperature of the fuel cells in a particularly simple way by virtue of cooling water from the fuel cells flowing through it. For this purpose, the fuel cell block has a cooling water line or a cooling water passage from the fuel cells to the heating elements of the humidification cells. While it is flowing through the fuel cells, the cooling water is heated to the temperature of the fuel cells.

As the cooling water flows through the heating element, the operating gas sweeping past the heating element is brought to approximately the temperature of the fuel cells. The further heating of the operating gas when it enters the fuel cells is so slight that the condensation of humidification water which results has no adverse effect on the operation and service life of the electrolyte. The use of the cooling water from the fuel cells as heating water in the humidification cells not only eliminates the need for an externally fed heating water circuit.

Furthermore, substantially automatic setting of the heating water temperature and therefore of the temperature of the operating gas to the temperature of the fuel cells is achieved.

The temperature of the humidification water can be matched to that of the fuel cells in a particularly simple way if a proportion of the cooling water from the fuel cells is used as heating water for the heating element, and a further proportion of the cooling water is used as humidification water in the humidification elements. For this purpose, the fuel cell block expediently has cooling water lines or cooling water passages leading from the cooling elements of the fuel cells to the heating elements and the humidification water spaces of the humidification elements.

A particularly space-saving heating element includes two metal sheets, between which there is a heating water space. The additional introduction of the heating element into each humidification cell of the fuel cell block increases the volume of the humidification cell stack and therefore of the fuel cell block to a not inconsiderable degree. However, low-temperature fuel cells and in particular PEM fuel cells are generally used in vehicles or in small appliances, such as for example a mobile telephone or a laptop.

The increase in the volume of the fuel cell block resulting from the introduction of the heating elements should therefore be minimized. A heating element which includes two metal sheets between which there is arranged a heating water space can be designed to be very thin. As a result, the fuel cell block retains its high power density.

It is expedient for the heating element to be arranged between the gas space of a humidification cell and the humidification water space of a humidification cell which adjoins this humidification cell. As a result, not only is the operating gas heated by the heating element, but also the humidification water, which likewise flows along the heating element, is held at approximately the temperature of the fuel cells.

A particularly simple design of a very flat humidification cell is achieved by virtue of one of the metal sheets having a stamped structure which forms the gas space, and the other of the metal sheets having a stamped structure which forms the humidification water space. A stamped structure of this type is produced, for example, by round hill-like elevations and depressions, around which, when the humidification cell is operating, the operating gas or humidification water flows on one side of the metal sheet and past which the heating water flows on the other side. In this case, the water-permeable membrane expediently bears directly against the stamped structure. Moreover, a stamped structure has the advantage that, unlike milled webs or channels, it does not have any sharp edges which damage the soft, mechanically sensitive membrane.

The fuel cell block can be produced at particularly low cost if the fuel cells each include a cooling element, the structure and shape of which are identical to those of the heating element. The use of identically shaped elements for the cooling element and the heating element simplifies production of these elements and their assembly to form the fuel cell block, which reduces production costs. The identical structure of the elements facilitates assembly of the fuel cell block and therefore reduces assembly costs.

A further advantage is achieved by virtue of the heating element and the cooling element being made from one or more identical materials. The cooling element of a fuel cell and the heating element of a humidification cell, while the fuel cell block is operating, are subject to the same requirements. That is, they have to be sufficiently mechanically stable to impart the required stability to the fuel cell block, and they must be sufficiently chemically stable. This is because, during operation, they have chemically highly aggressive gases, such as for example humidified pure oxygen or humidified pure hydrogen flowing around them. The fact that the demands imposed are identical makes it possible to employ an identical choice of materials, which reduces the costs of producing the heating element and the cooling element. Heating element and cooling element may be made from just one identical material, such as for example from a metallic alloy, or may be manufactured from a plurality of identical materials, such as for example from an electrically conductive plastic with one or more metallic coatings.

It is expedient for the cooling element to have an additional metallic coating compared to the heating element. The cooling element, unlike the heating element from the humidification cell, also serves as an interconnector plate, i.e. as an electrical connection between the anode of a fuel cell and the cathode of an adjacent fuel cell. Contact of this type can be achieved particularly easily by means of a metallic coating, for example made from a precious metal. When the heating element is being produced, there is no need for an additional coating of this type, with the result that the production costs of the heating element can be reduced.

The planning, designing, production and assembly of the fuel cell block can be simplified by virtue of the external shape and external dimensions of the fuel cells being identical to the shape and dimensions of the humidification cells. This makes it possible to standardize production of fuel cells and humidification cells. Moreover, this simplifies the structure of the fuel cell block, since the components of a fuel cell block which surround the cells, such as for example tie rods, piping or a casing around the fuel cell block, do not have to be matched to different sizes of humidification cells and fuel cells.

The heating element and the cooling element are advantageously surrounded along their outer edges by in each case a frame made from the same material. The frame connects the fuel cells or the humidification cells to one another and seals off the fuel cell block with respect to the outside. The same demands are imposed on the material of these frames in both the fuel cells and the humidification cells. Therefore, it is expedient for the sealing material surrounding the heating element to be selected to be identical to the sealing material surrounding the cooling element.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

Identical components are provided with identical reference symbols throughout the figures.

DETAILED DESCRIPTION OF THE PREFERRED EMBODIMENTS

Figure 1:
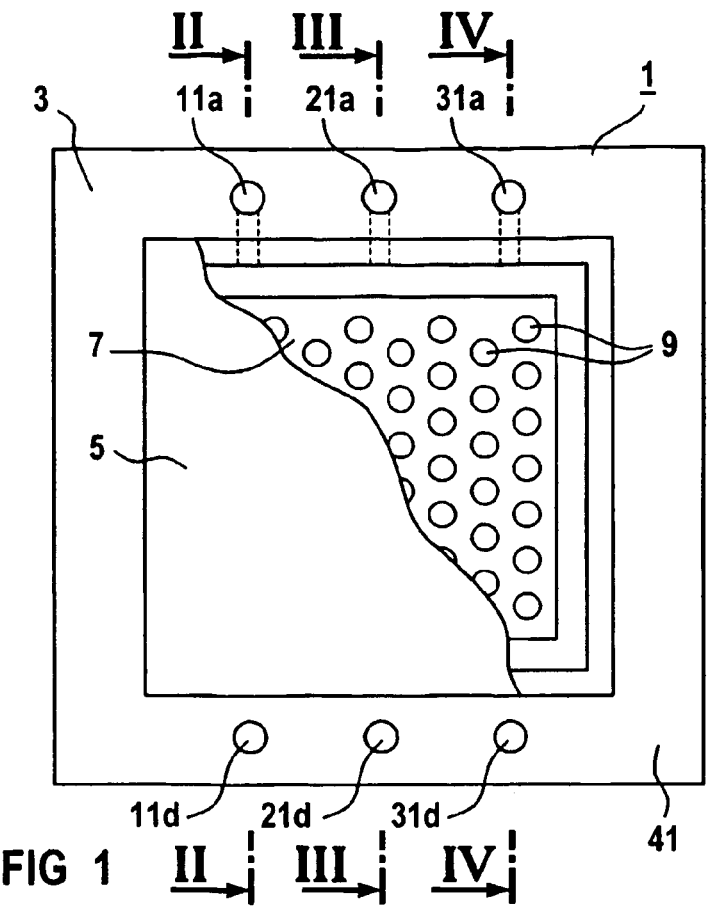
FIG. 1 shows a plan view of a humidification cell illustrated in cut-away form.

FIG. 1 shows a diagrammatic plan view of a rectangular and planar humidification cell 1, which includes a membrane 5 which is embedded in a frame 3 and is illustrated in cut-away form. Beneath the membrane 5 there is a heating element 7, which is surrounded by the frame 3. The heating element 7 has a stamped structure 9 which is configured in the form of round elevations and depressions. A first axial passage opening 11a, through which humidification water flows when the humidifier cell 1 is operating, is formed in the frame 3.

Figure 2:
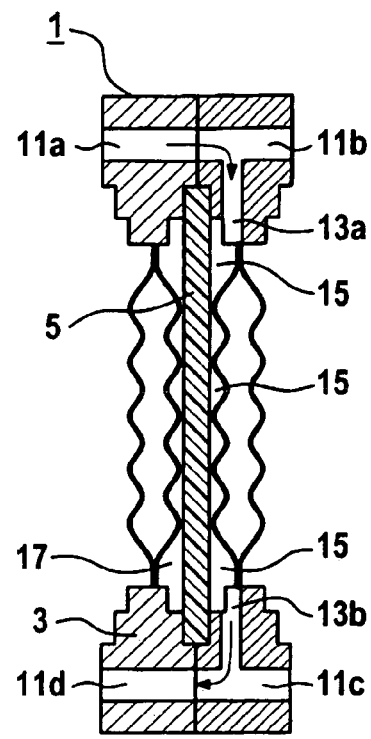
FIG. 2 shows a section through the humidification cell from FIG. 1.

FIG. 2 shows a section through the humidification cell 1 along the axial passage 11b which routes the humidification water. While the humidifier cell 1 is operating, humidification water flows through the first axial passage opening 11a into the first axial passage 11b. From the first axial passage 11b, it flows into a first radial passage 13a leading into the humidification water space 15 of the humidification cell 1. While it is flowing through the humidification water space 15, the humidification water sweeps along the water-permeable membrane 5, with some of the humidification water penetrating through the membrane 5 and passing into the gas space 17 of the humidification cell 1. The remaining humidification water flows onward into the second radial passage 13b and then passes into the second axial passage 11c, which likewise routes humidification water. Passing through the second axial passage opening 11d, the humidification water leaves the humidification cell 1 again.

Figure 3:
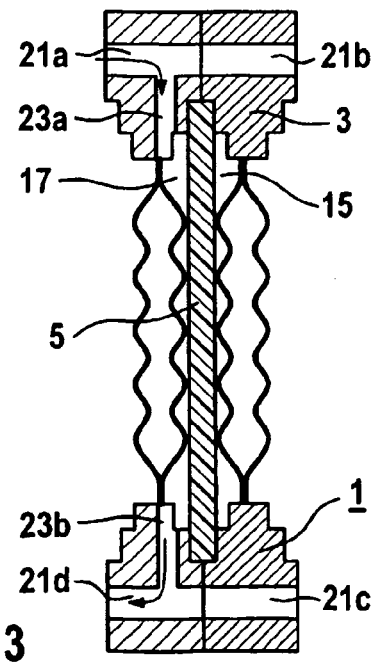
FIG. 3 shows a further section through the humidification cell.

While the humidification cell 1 is operating, the operating gas which is to be humidified flows through a third axial passage opening 21a and in this way passes into the third axial passage 21b shown in FIG. 3. From there, the operating gas in each case flows through the third radial passages 23a into the gas spaces 17 of the humidification cells 1. These humidification cells 1 have been joined together to form a humidification cell stack, only one of which is illustrated in the figures. In the gas space 17 of the humidification cell 1, the operating gas is humidified by the humidification water which has passed through the membrane 5. The humidified operating gas leaves the gas space 17 through the fourth radial passage 23b, enters the fourth axial passage 21c and leaves the humidification cell 1 through the fourth axial passage opening 21d shown in FIGS. 1 and 3.

Figure 4:
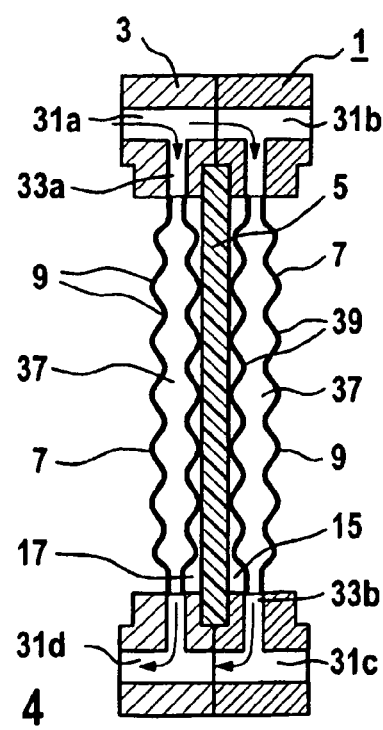
FIG. 4 shows a further section through the humidification cell.

FIG. 4 shows a section through the humidification cell 1 on line C-C and along the fifth axial passage 31b and sixth axial passage 31c, through which heating water flows while the humidification cell 1 is operating. The heating water is routed through the fifth axial passage opening 31a into the fifth axial passage 31b, from where it passes into the fifth radial passage 33a and then into the heating water space 37 of the heating element 7. The heating water flows through the heating water space 37 of the heating element 7 and leaves the heating element 7, after it has flowed through the sixth radial passage 33b, by passing into the sixth axial passage 31c. Flowing through the sixth axial passage opening 31d, it leaves the humidification cell 1.

The heating element 7 includes two metal sheets 39, between which there is arranged the heating water space 37. The two metal sheets 39 each have a stamped structure 9, which, in conjunction with the water-permeable membrane, forms the humidification water space 15 on one side of the heating element 7 and the gas space 17 of an adjacent humidification cell on the other side of the heating element 7.

A heating element 7 and a membrane 5 are in each case stacked alternately within the fuel cell stack formed from planar humidification cells 1, with both the membranes 5 and the heating elements 7 being surrounded by frames 3 made from an elastomeric sealing material, which are likewise stacked on top of one another. Therefore, the following components are arranged in an alternating sequence in the humidification cell stack: a water-permeable membrane 5, a humidification water space 15, a metal sheet 39 of a heating element 7, a heating water space 37, a second metal sheet 39 of a heating element 7, a gas space 17, a further membrane 5, etc.

The humidification of the operating gas flowing through the gas space 17 with the humidification water passing through the membrane 5 cools the membrane 5 as a result of the heat of evaporation loss. However, this heat loss only represents slight cooling of the operating gas, since the operating gas, as it flows through the gas space 17, flows along a metal sheet 39 of the heating element 7. While the humidification cell 1 is operating, the heating element 7 permanently has cooling water from the fuel cells 101 of the fuel cell block 50 flowing through it, and is heated to the temperature of the fuel cells 101.

The metal sheet 39 now transfers heat from this cooling water, which is now functioning as heating water, to the operating gas, which therefore leaves the gas space 17 having been heated to approximately the temperature of the fuel cells 101. This ensures that the operating gas, during the humidification in the gas space 17, can take up sufficient water for the electrolyte membrane of the fuel cells 101 through which it subsequently flows not to dry out and therefore not to be damaged. As a result, the operating life of the fuel cells 101 of the fuel cell block 50 is lengthened considerably.

Figure 5:
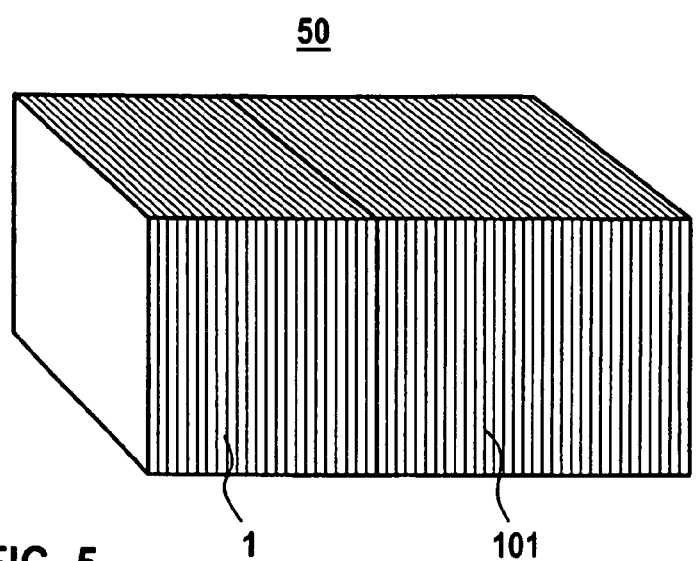
FIG. 5 shows a fuel cell block.

FIG. 5 shows a fuel cell block 50 having a stack of planar fuel cells 101 stacked on top of one another and a stack of planar humidification cells 1 adjacent to the fuel cell stack. The fuel cells 101 of the fuel cell stack 50 have a similar structure to the humidification cells 1 of the humidification cell stack of the fuel cell block 50.

Figure 6:
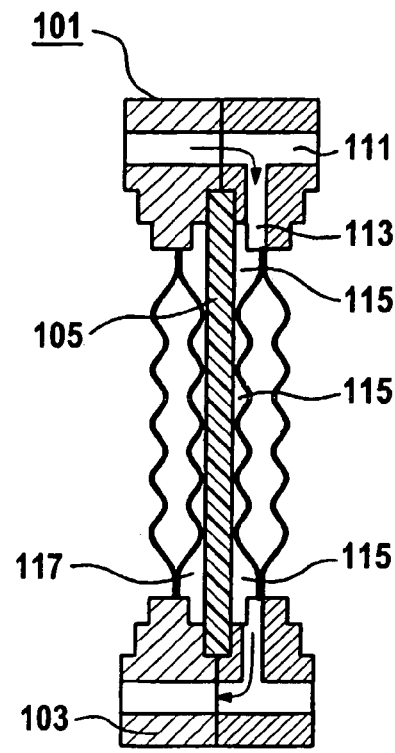
FIG. 6 shows a section through a fuel cell.
Figure 7:
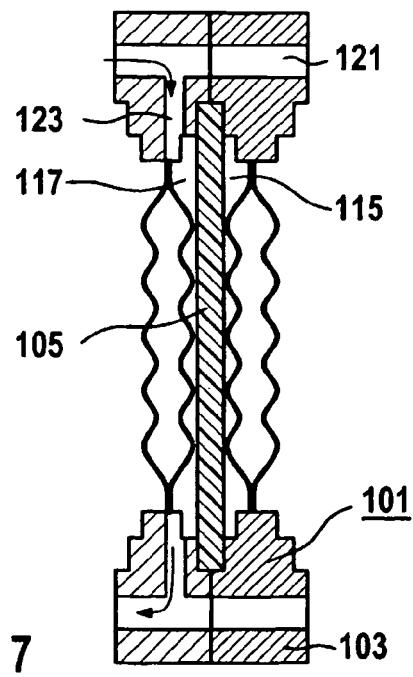
FIG. 7 shows a further section through a fuel cell.
Figure 8:
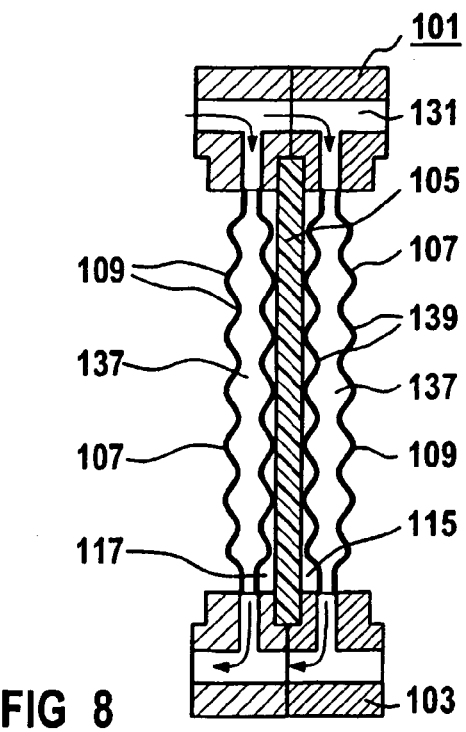
FIG. 8 shows a further section through a fuel cell.

FIGS. 6, 7 and 8 each show a section through a fuel cell 101 of the fuel cell block 50, with the sections through the fuel cell 101 being taken in the same way as the sections through the humidification cell 1 in FIGS. 2, 3 and 4.

The fuel cell 101 includes an electrolyte-electrode assembly 105, which includes a membrane, and in each case one cooling element 107 arranged on the two flat sides of the electrolyte-electrode assembly 105. The cooling element 107, like the heating element 7 of the humidification cell 1, includes two metal sheets 139, which each have a stamped structure 109. The two metal sheets 139 surround a cooling water space 137, through which cooling water for cooling the fuel cell 101 flows when the fuel cell 101 is operating. The stamped structure 109 of the fuel cell 101, in conjunction with the electrolyte-electrode assembly 105, forms a first gas space 115 and a second gas space 117 on either side adjacent to this assembly 105.

While the fuel cell 101 is operating, an oxygen-containing first operating gas flows through an axial passage 111 and a radial passage 113 into the first gas space 115, and a hydrogen-containing second operating gas flows through the axial passage 121 shown in FIG. 7 and a radial passage 123 into the second gas space 117 of the fuel cell 101. In a similar way to the heating water flowing through the heating element 7 of the humidification cell 1, the cooling water also flows through the cooling element 107 of the fuel cell 101.

The structure and shape of the cooling element 107 of the fuel cell 101 are identical to the heating element 7 of the humidification cell 1. Both the heating element 7 and the cooling element 107 include two metal sheets 39 or 139, respectively, which form a water space 37 or 137, respectively, and each have a stamped structure 9 or 109, respectively.

The metal sheets 39 and the metal sheets 139 are made from the same materials, except that the cooling element 107, on its two outer sides, has an additional metallic coating of gold. This metallic coating is used to make electrical contact between the cooling element 107 and the electrolyte-electrode assembly 105. Since there is no need for electrical contact of this type to be made within a humidification cell, an additional metallic coating of this type can be dispensed with during production of the heating element 7.

Like the humidification cell 1, the fuel cell 101 also includes a frame 103 made from an elastomeric sealing material, in which both the cooling element 107 and the electrolyte-electrode assembly 105 are embedded along their narrow sides. The frames 3 and 103 of the humidification cell 1 and the fuel cell 101, respectively, are made from the same elastomer. The external shape and external dimensions of the frames 3 and 103 are also identical, and consequently the shape and dimensions of the humidification cell 1 are also identical to those of the fuel cell 101. The water-permeable membrane 5 in the humidification cell 1 is made from the same material as the electrolyte within the electrolyte-electrode assembly 105 of the fuel cell 101, for example is made from a polymer such as for example NAFION produced by DuPont from Wilmington, Del.

The use of materials, shapes and sizes of the same type for elements of both the humidification cell 1 and the fuel cell 101 makes a humidification cell 1 very simple, quick and inexpensive to produce. Moreover, the similarity of the humidification cell 1 to the fuel cell 101 simplifies the planning and designing of a fuel cell block 50. A further advantage is that fuel cell blocks in which the humidification cell and fuel cell are designed identically can be planned and implemented very simply and flexibly, with the result that the manufacturer of the fuel cell block can work very flexibly and with good customer focus.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A fuel cell block, comprising:
   a stack of planar fuel cells; and
   a stack of planar humidification cells including at least a first humidification cell and a second humidification cell, wherein the first and second humidification cells each include,
   a gas space,
   a humidification water space,
   a water-permeable membrane arranged between the gas space and the humidification water space, and
   a planar heating element adjoining the gas space, wherein the planar heating element includes a heating water space arranged between two metal sheets,
   further wherein the planar heating element of the first humidification cell is arranged between the gas space of the first humidification cell and the humidification water space of the second humidification cell.

2. The fuel cell block as claimed in claim 1, wherein one of the metal sheets includes stamped structures which form the gas space of the first humidification cell, and wherein the other of the metal sheets includes stamped structures which form the humidification water space of the second humidification cell.

3. The fuel cell block as claimed in claim 1, wherein the fuel cells each include a cooling element, wherein a structure and a shape of the cooling element is identical to a structure and a shape of the heating element.

4. The fuel cell block as claimed in claim 3, wherein the cooling element includes all materials used to form the heating element and a metallic coating,
   further wherein the materials used to form the heating element exclude the metallic coating.

5. The fuel cell block as claimed in claim 1, wherein an external shape and external dimensions of the fuel cells are identical to an external shape and external dimensions of the humidification cells.

6. The fuel cell block as claimed in claim 2, wherein the fuel cells each include a cooling element, wherein a structure and a shape of the cooling element is identical to a structure and a shape of the heating element.

7. The fuel cell block as claimed in claim 6, wherein the cooling element includes all materials used to form the heating element and a metallic coating,
   further wherein the materials used to form the heating element exclude the metallic coating.

8. The fuel cell block as claimed in claim 2, wherein an external shape and external dimensions of the fuel cells are identical to an external shape and external dimensions of the humidification cells.

9. The fuel cell block as claimed in claim 3, wherein an external shape and external dimensions of the fuel cells are identical to an external shape and external dimensions of the humidification cells.

10. The fuel cell block as claimed in claim 4, wherein an external shape and external dimensions of the fuel cells are identical to an external shape and external dimensions of the humidification cells.

11. The fuel cell block as claimed in claim 6, wherein the heating element and the cooling element are each surrounded by a frame made from the same material as the heating element or as the cooling element.

12. The fuel cell block as claimed in claim 3, wherein the heating element and the cooling element are, each surrounded by a frame made from the same material as the heating element or as the cooling element.

13. The fuel cell block as claimed in claim 4, wherein the heating element and the cooling element are each surrounded by a frame made from the same material as the heating element or as the cooling element.

14. The fuel cell block as claimed in claim 5, wherein the heating element and the cooling element are each surrounded by a frame made from the same material as the heating element or as the cooling element.

15. The fuel cell block as claimed in claim 7, wherein the heating element and the cooling element are each surrounded by a frame made from the same material as the heating element or as the cooling element.

16. The fuel cell block as claimed in claim 7, wherein an external shape and external dimensions of the fuel cells are identical to an external shape and external dimensions of the humidification cells.

\* \* \* \* \*